United States Patent [19]
Barber

[11] 3,994,041
[45] Nov. 30, 1976

[54] VEHICLE WASHING AND DRYING APPARATUS

[75] Inventor: Ivan J. Barber, Mississauga, Canada

[73] Assignee: The Allen Group Inc., Melville, N.Y.

[22] Filed: May 19, 1975

[21] Appl. No.: 578,403

[52] U.S. Cl. .............................. 15/302; 15/312 R; 15/414; 15/DIG. 2
[51] Int. Cl.² .......................................... B60S 3/04
[58] Field of Search ............. 15/302, 312 R, 316 R, 15/405, 408, 414, DIG. 2

[56] References Cited
UNITED STATES PATENTS

| | | | |
|---|---|---|---|
| 3,451,094 | 6/1969 | Kywi | 15/302 |
| 3,590,417 | 7/1971 | Emanuel | 15/302 |
| 3,705,435 | 12/1972 | Von Kulmer | 15/302 X |
| 3,806,985 | 4/1974 | Takeuchi | 15/316 R X |

*Primary Examiner*—Christopher K. Moore
*Attorney, Agent, or Firm*—Fulwider, Patton, Rieber, Lee & Utecht

[57] ABSTRACT

Vehicle washing and drying apparatus including an inverted U-shaped frame adapted to roll over a vehicle while it is in a stationary position and having mounted thereon a fluid spray device for spraying cleaning fluid onto the surface of the automobile. A drying device is also mounted on the frame and includes side nozzles for blowing drying air onto the sides of the vehicle and a top nozzle projecting downwardly from the top of the frame and intermediately articulated so the lower portion thereof forms a normally downwardly facing horizontally elongated lower level orifice for directing drying air onto the tops of low profile vehicles. The lower portion of such nozzle may be folded away to clear higher profile vehicles and exposes an upper level horizontally elongated orifice which directs drying air onto the tops of higher profile vehicles. A control device is provided for controlling retraction of the lower nozzle and is operative in response to a sensing device which senses the high profile vehicle to automatically retract such nozzle.

14 Claims, 10 Drawing Figures

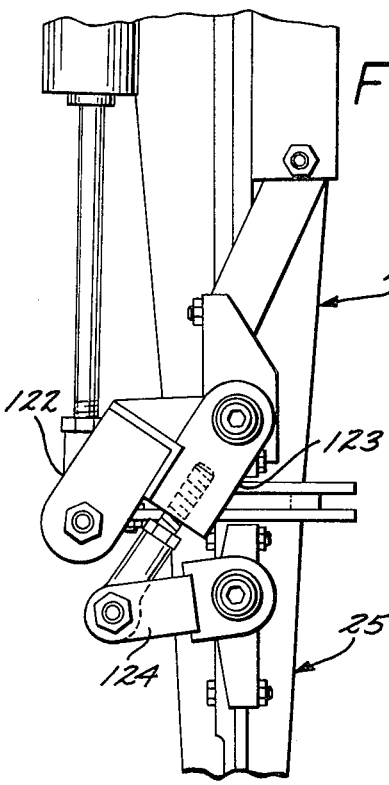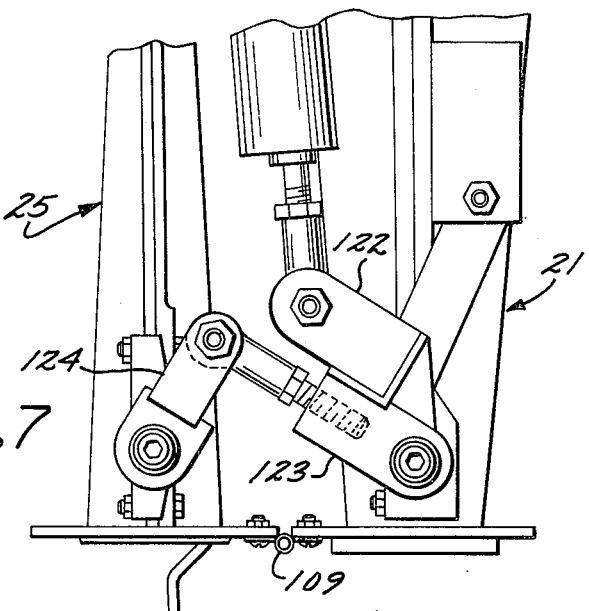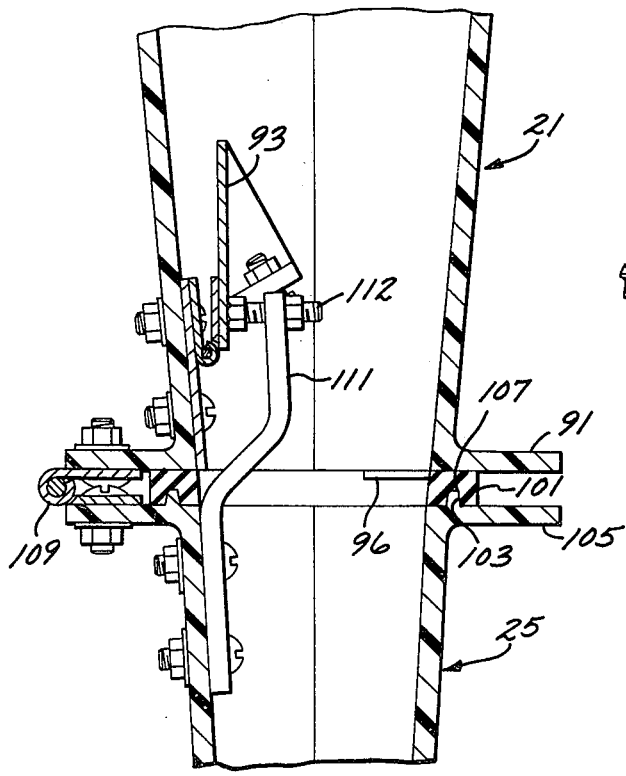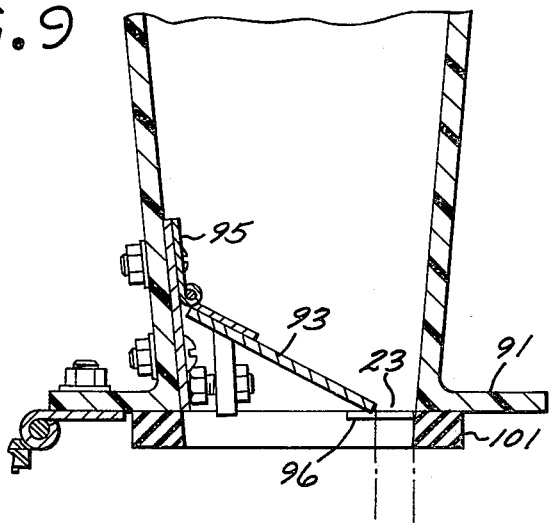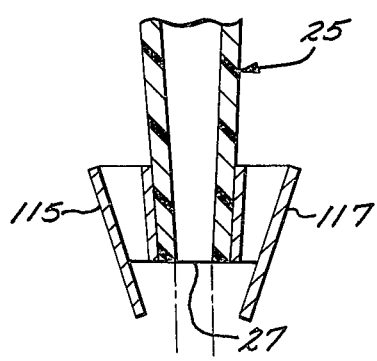

VEHICLE WASHING AND DRYING APPARATUS

BACKGROUND OF THE INVENTION

1. Field of the Invention

The vehicle washing and drying apparatus of the present invention relates to an automatic car washing device which will efficiently and rapidly dry both low and high profile vehicles.

2. Description of the Prior Art

Due to the unreliability of low cost labor frequently employed in commercial car wash installations, many efforts have been made in recent years to fully automate the washing and drying process to thereby minimize use of such labor and the problems associated therewith. Further, with the limited space available in the bays of existing gas stations and the like, it is important to provide a compact washer and dryer. Consequently, car wash devices have been proposed which include spraying devices for automatically spraying cleaning fluid on the surface of an automobile to be washed and for brushing such vehicle. Further, various drying devices have been provided for blowing drying air onto the surface of the automobile as it emerges from the washing station to accelerate drying of such vehicle. However, many of these prior art devices suffer the shortcoming that the drying nozzles are either rigidly mounted or are only adapted to follow the contour of the hood and top of vehicles and have only a limited capability of following variations in the vertical profile of different automobiles.

SUMMARY OF THE INVENTION

The vehicle washing and drying apparatus of the present invention is characterized by a downwardly projecting top nozzle terminating in a lower horizontally projecting orifice for drying the top surfaces of low profile vehicles. Such nozzle is intermediately articulated and connected with retraction means for selective retraction of the lower portion thereof to clear higher profile vehicles and, concurrently, expose an elevated horizontally extending orifice for discharging air proximate the top surfaces of such higher profile vehicles.

DESCRIPTION OF THE DRAWINGS

FIGS. 6 and 7 are detailed views, in enlarged scale, taken from FIGS. 4 and 5, respectively;

FIGS. 8 and 9 are partial vertical sectional views, in enlarged scale, taken along the line 8—8 of FIG. 3, and depicting the articulated top nozzle in its lowered and raised positions, respectively; and FIG. 10 is a detailed sectional view, in enlarged scale, depicting the lower nozzle orifice.

DESCRIPTION OF THE PREFERRED EMBODIMENT

Figure 4:
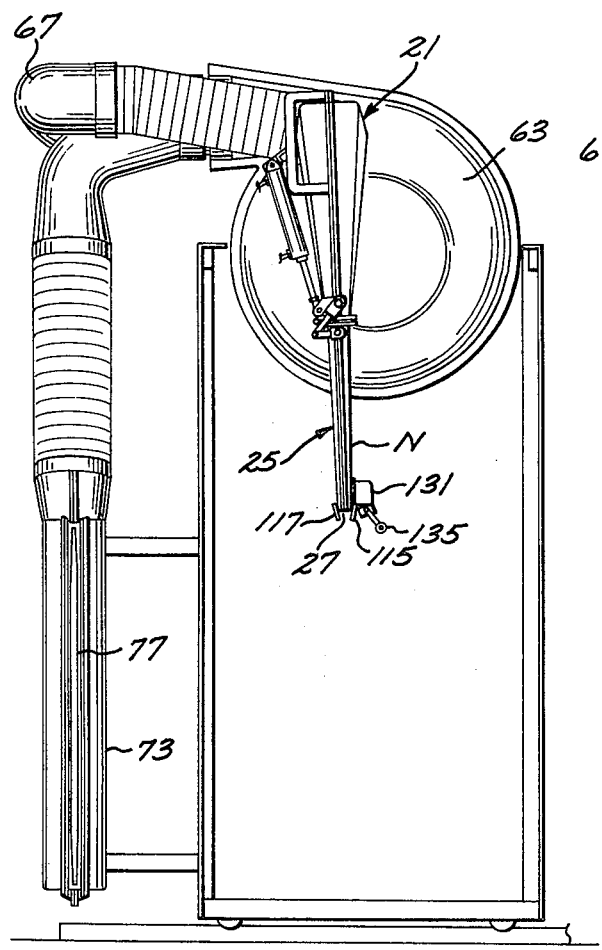
FIG. 4 is a vertical sectional view, taken along the line 4—4 of FIG. 3.
Figure 5:
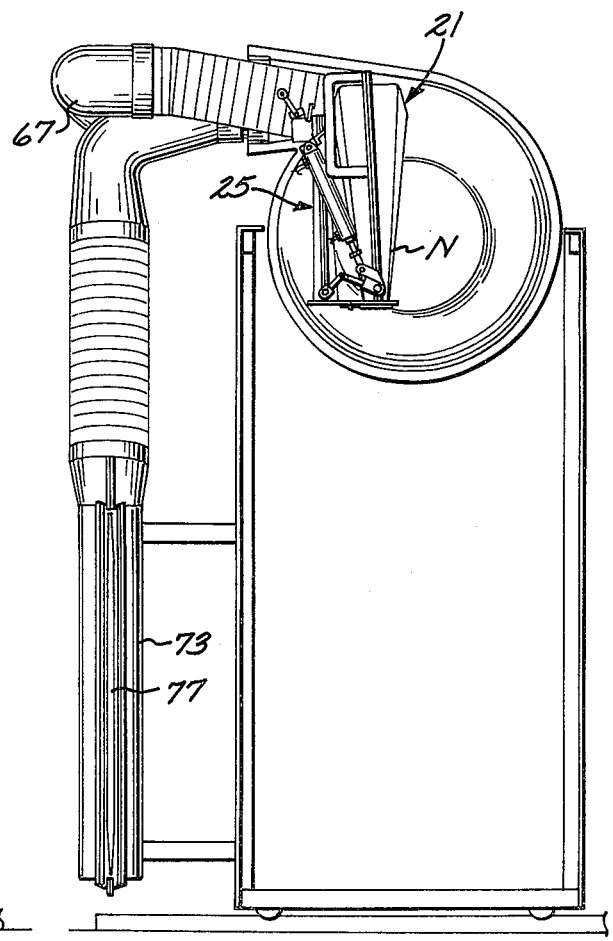
FIG. 5 is a vertical sectional view, taken along the line 5—5 of FIG. 3.

Referring to FIGS. 4 and 5, the vehicle washing and drying apparatus of the present invention, includes, generally, an inverted U-shaped frame 11 having a water spray system 13, a brush system 15 and a dryer system 17 mounted thereon. The dryer system 17 includes a top nozzle N (FIG. 4) having a horizontal elongated stationary main nozzle, generally designated 21, which tapers downwardly and inwardly to terminate at its lower extremity in a horizontally elongated elevated orifice 23 (FIG. 9) and has a lower nozzle, generally designated 25 (FIG. 8) hingedly connected therewith and normally projecting downwardly to terminate in a horizontally elongated lower orifice 27 (FIG. 4) such lower nozzle 25 being retractable to the raised position shown in FIG. 5 whereby such lower nozzle 25 may be employed to dry the top surfaces of low profile vehicles and the upper nozzle 21 may be employed to dry the top surfaces of high profile vehicles.

Figure 1:
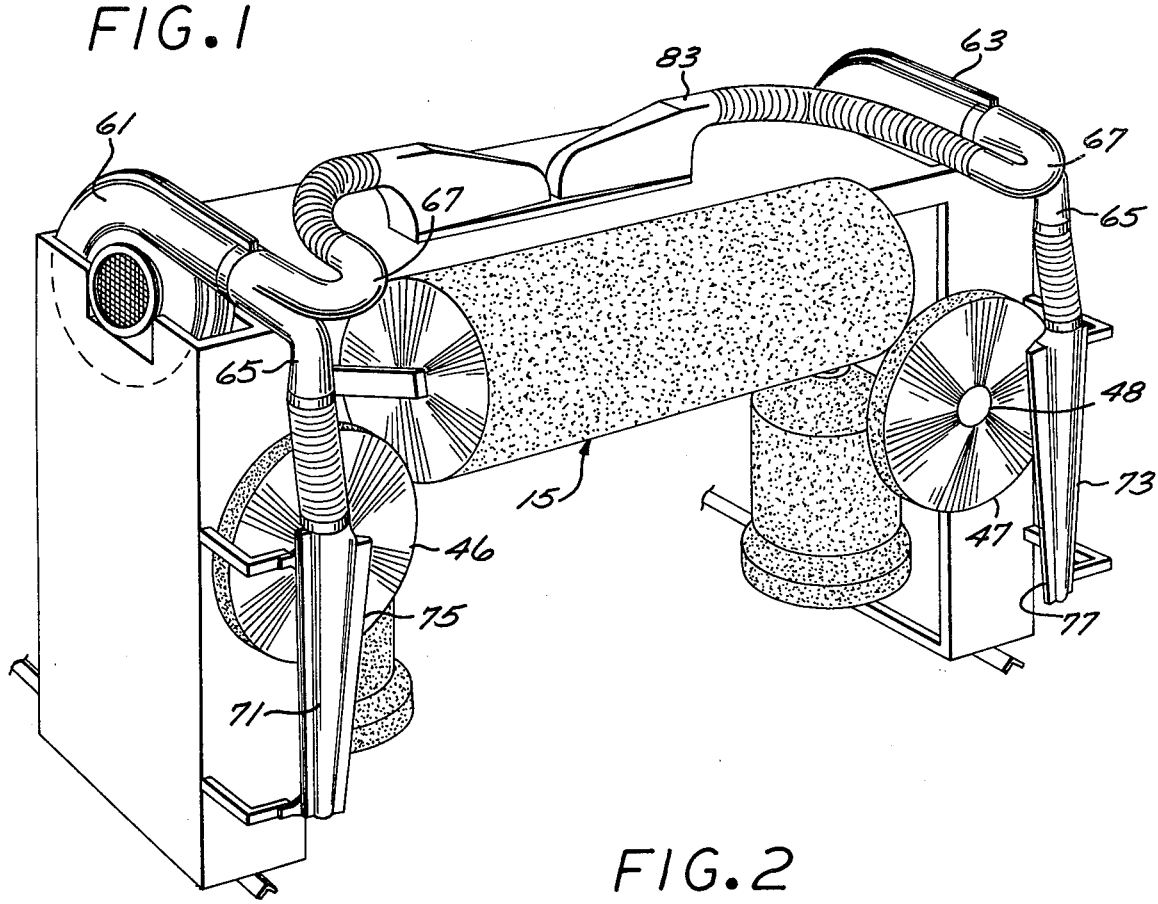
FIG. 1 is a perspective view of a vehicle washing and drying apparatus embodying the present invention.
Figure 2:
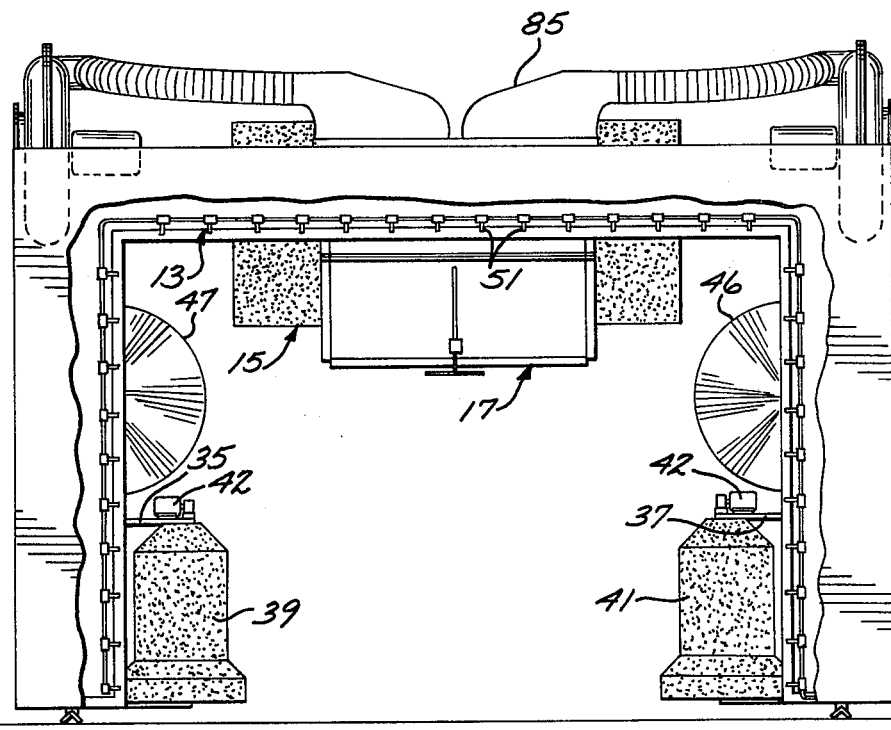
FIG. 2 is a rear elevational view, partially broken away, of the vehicle washing and drying apparatus shown in FIG. 1.
Figure 3:
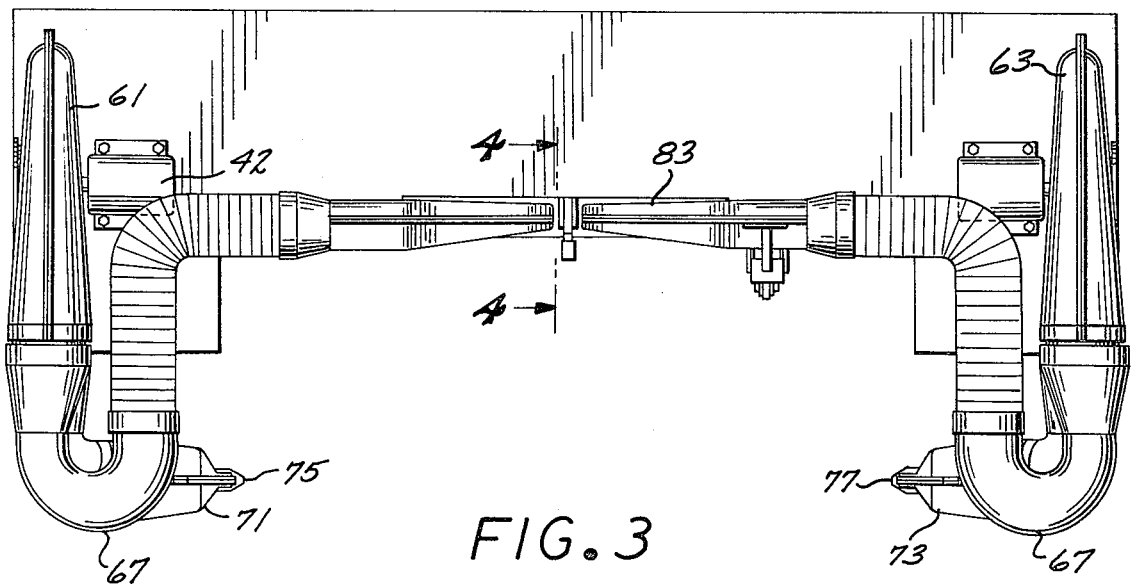
FIG. 3 is a top view, in enlarged scale, of the vehicle washing and drying apparatus shown in FIG. 1.

There exists a great demand for automatic car wash devices which are relatively compact, efficient and convenient to operate and provide thoroughly washing of cars of various sizes. Referring to FIG. 1, it has proven desirable to provide a roll-over type unit employing frame 11 which is in the general shape of an inverted U and is carried at its base on parallel rails 31 by means of wheels 33 (FIG. 2). Mounted from the frame 11 by means of arms 35 and 37 are a pair of respective upstanding cylindrical side brushes 39 and 41 which are selectively moved transversely inwardly to contact the opposite sides of a vehicle over which the frame 11 is passed to brush the sides thereof. Such brushes are rotated about their vertical axes by means of motors 42. Further, a horizontally extending cylindrically shaped rotary top brush 45 is carried from the top of the frame 11 by means of pivot arms 47 for reciprocation upwardly and downwardly while rotated about a horizontal axis by means of a drive motor (not shown).

Disposed on opposite sides of the frame 11 and intermediate the top brush 45 and respective side brushes 39 and 41 are respective windmill type circular window brushes 46 and 47 (FIG. 1) which are rotated about respective longitudinally extending axes 48 by means of respective motors (not shown).

The spray system 13 is in the form of an inverted U-shaped manifold having a plurality of spray nozzles 51 (FIG. 2) spaced along the top and opposite sides thereof.

Still referring to FIG. 1, at the top of frame 11 and on the opposite sides thereof are a pair of blowers 61 and 63 which have their outlets connected with respective conduits that separate into side nozzle conduits 65 and top conduits 67. The side conduits lead downwardly to respective side nozzles 71 and 73 mounted on opposite sides of the frame 11 and formed with vertically elongated inwardly opening side orifices 75 and 77.

The respective top conduits 67 lead to respective inlet housings 81 and 83 which combine to feed the upper end of the main top nozzle 21.

Referring to FIGS. 4 and 8, the main top nozzle 21 is somewhat triangular shaped in vertical cross section, having its opposite side walls tapering downwardly and formed at their respective lower extremities without outwardly flared peripheral flanges 91.

Referring to FIGS. 8 and 9, mounted within the lower extremity of the main top nozzle 21 is a throttling door 93 carried on one side from a hinge 95 for selective pivoting between the throttling position shown in FIG. 9 and the open position shown in FIG. 8. The throttling door is biased to its throttling position and the free side thereof engages a stop 96 (FIG. 9) mounted in the top of the lower nozzle 25 when such door is lowered. Mounted under the nozzle flanges 91 and extending parametrically about the main orifice 23 is a rectangular gasket 101 having a downwardly opening continuous groove 103 formed therein.

The retractable nozzle 25 is also somewhat V-shaped in vertical cross section with its upper end normally confronting the main orifice 23 and being formed with an outwardly flared parametrical flange 105 which has an upwardly projecting rib 107 formed therein for receipt in the sealing groove 103 of the gasket 101. Referring to FIG. 8, the upper end of the retractable nozzle 25 is fastened along one edge to the main nozzle 21 by means of an elongated hinge 109.

Still referring to FIGS. 8 and 9, a pusher 111 is mounted on its lower extremity to the interior of the retractable nozzle 25 and in the lowered position of such nozzle 25, projects upwardly into the interior of the main nozzle 21 to engage the free extremity of the door 93 to push the free extremity of such door upwardly to its open position shown in FIG. 8. Such pusher 111 is formed in its projecting extremity with a through threaded bore which receives an adjustment stud 112 which can be adjusted to adjust the degree to which such door 93 is held open.

Referring to FIG. 10, the lower extremity of retractable nozzle 25 has a pair of downwardly and inwardly slanting entrainer vanes 115 and 117 mounted on the opposite sides thereof for entraining auxiliary air in the lower nozzle orifice 27.

Referring to FIGS. 6 and 7, a retraction piston 121 is connected on its upper extremity with the frame 11 and projects downwardly to have its ram pivotally connected on its lower extremity with the free end of an actuator bracket 122 rigidly affixed to an actuator lever 123 pivotally carried from the main nozzle 21. The free extremity of the actuator lever is pivotally connected with the free extremity of a lifter link 124 which is, in turn, pivotally mounted on its opposite extremity from the retractable nozzle 25.

Referring to FIG. 4, a sensor switch, generally designated 131, is mounted at the lower extremity of the retractable nozzle 25 and has a feeler arm 133 carried pivotally therefrom and projecting downwardly to have a transverse feeler rod 135 mounted on its free extremity. The switch 131 is connected with a control valve (not shown) controlling flow of hydraulic fluid to the retraction cylinder 121 and is operative upon depression of the arm 133 to retract the ram in such piston 121 to the position shown in FIG. 6, thus retracting the retractable nozzle 25 to its elevated position.

In operation, when an automobile is to be washed, the spray system 13 is pressurized to commence spraying water from the nozzles 51, the brush drive motors started to commence rotation of the side brushes 39 and 41, window brushes 46 and 47, and top brush 45. The drive motors driving the wheels 33 (FIG. 2) are then energized to commence movement of frame 11 along the rails 31 to wash a car parked between such rails. As the frame 11 passes over such car, the side brushes 39 and 41 will engage such car and be retracted somewhat thereby to accommodate the width of the car. The hood of such car will engage the top brush 45 to raise such brush slightly to travel over such hood as it passes thereunder and to then climb up the windshield and brush the roof as travel of the frame 11 past such car continues. Concurrently, the spinning windmill type window brushes 46 and 47 will brush the side windows of the car. If desirable, detergent may be utilized in the spray system 13 during the initial pass and thereafter the brushes retracted and a rinse pass made over such car to spray rinse water from the nozzle 51 to rinse the suds from the car.

On its final pass over the car after washing thereof, the blowers 61 and 63 are energized to force air therefrom to be divided between the respective side conduit 65 and top conduit 67, the air from such side conduit 65 being forced from the side nozzles 75 and 77 at a high rate of speed to accelerate drying of the sides of the automobile. The air introduced into the top conduit 67 is fed directly into the top end of the main nozzle 21 to be forced downwardly therethrough, and as long as the retractable nozzle 25 is in its lowered position shown in FIG. 4, to continue on through the retractable nozzle 25 to be emitted from the lower nozzle orifice 27 for impingement on the top surfaces of such car as the frame 11 continues its pass thereover.

Referring to FIG. 10, it will be appreciated that the entraining vanes 115 and 117 serve to draw auxiliary air therein for mixing with that emitted from the orifice 27.

When it is desirable to wash a high profile vehicle, the procedure described hereinabove is repeated except that when the elevated surfaces of such vehicle contact the feeler rod 135 and depress the free extremity of the arm 133, the retraction switch 131 will be actuated to pressure the rod end of the retractor cylinder 121 (FIGS. 6 and 7) to retract the piston thereof to rotate the rocker arm 123, thereby raising the free end of such link to the position shown in FIG. 9 to draw the lower extremity of the retractable nozzle 25 to the left as viewed in FIG. 6, thus pivoting such retractable nozzle 25 about the hinge 109 (FIG. 8) and as retraction of the retractor cylinder piston continues rotation of the link 123, the retractable nozzle 25 will be pivoted substantially 180° about the hinge 109 to assume the retracted position shown in FIG. 7. It is important that the actuating lever 123 and link 124 are articulated to thus accommodate the variations in radius of curvature as the lower retractable nozzle pivots about its hinge 109 as a result of the actuating lever pivoting about a point different than the center of curvature for the path of the retractable nozzle 21. Further, a key to practical nozzle retraction is the provision of connection of the cylinder 21 with bracket 122 intermediate the points where the opposite ends of the lever 123 connect to thus provide for a minimum amount of cylinder piston travel thereby conserving air pressure and minimizing movement of the retraction linkage.

It will be appreciated that as such retraction takes place, the pusher 111 will be withdrawn from the upper orifice 23, thus allowing the free extremity of the throttling door 93 to be biased downwardly until the free end thereof engages the stop 99 (FIG. 9) thus leaving only approximately 10% of the width of the orifice 23 open for throttling of air therethrough. Thus, when the blowers 61 and 63 are actuated during the drying pass over the automobile, the air through the top conduit 67 into the main nozzle 21 will be accelerated from the elevated orifice 23 to impinge upon the top surface of the automobile to accelerate drying of such top surface.

From the foregoing it will be apparent that the vehicle washing and drying apparatus of the present invention provides an economical and convenient means for rapidly and thoroughly washing automobiles of different height profiles.

Various modifications and changes may be made with regard to the foregoing detailed description without departing from the spirit of the invention.

I claim:

1. Vehicle washing and drying apparatus for movement relative to first and second vehicles having respective relatively high and relatively low profiles to wash and dry such vehicles and comprising:
    a frame;
    wash means including spray nozzles mounted on said frame for spraying washing fluid on said vehicles;
    drying means mounted on said frame and including a main top nozzle projecting downwardly to terminate at its lower extremity in horizontally elongated first orifice means disposed proximate the plane of the top of said first vehicle;
    a retractable top nozzle having a normal position projecting downwardly from said first orifice to terminate at its lower extremity in horizontally elongated second orifice means spaced below the tops of said first vehicles and proximate the top of said second vehicle and having a retracted position raised clear of said first orifice means;
    articulation means mounting said retractable top nozzle from said main top nozzle for retraction from said normal to said retracted positions;
    retraction means connected with said retractable nozzle and operative to retract said retractable nozzle to clear the tops of said first vehicles and clear said first orifice means; and
    blower means for blowing drying air into said main top dryer nozzle whereby when said first vehicle is to be washed said retractable nozzle may be retracted to cause said retractable nozzle to clear said first vehicle and expose said first orifice means to blow drying air directly onto the top of said first vehicle when it moves relative thereto and when said second vehicle is to be washed, said retractable nozzle may be lowered to its normal position to dispose said second orifice means proximate the top of said second vehicle as it moves relative thereto.

2. Vehicle washing and drying apparatus according to claim 1 wherein:
    said retraction means includes an actuating lever pivotally mounted on one extremity from said main top nozzle and projecting therefrom to form a free extremity, a lifter link pivotally mounted on one extremity from said lower nozzle projecting therefrom and pivotally connected on its opposite extremity to said free extremity, a fluid cylinder carried on one extremity from said frame and connecting means connecting the opposite extremity of said cylinder with said actuating lever intermediate the ends thereof.

3. Vehicle washing and drying apparatus according to claim 2 wherein:
    said actuating lever is in the form of a feeler suspended from said retractable nozzle and disposed below the plane of the top of said first vehicle and said retraction means includes piston means connected between said frame and means retractable nozzles and includes control means responsive to contact of said feeler by said first vehicle to actuate said piston means to retract said retractable nozzle and further responsive to clearance of said feeler by said first vehicle to de-activate said piston means to lower said retractable nozzle.

4. Vehicle washing and drying apparatus according to claim 1 that includes:
    throttle means mounted in said first orifice means and shiftable between an open position and a closed position cooperating with said first orifice means to define a throttling orifice; and
    throttle control means connected with said throttle means and responsive to retraction of said retractable nozzle to close said throttle means.

5. Vehicle washing and drying apparatus according to claim 4 wherein:
    said throttle means includes a throttle door hingedly mounted on one side to one side of the first orifice and having a closed position partially closing said first orifice to throttle air therethrough; and
    said throttle control means includes a pusher arm carried from said retractable nozzle and projecting therefrom to engage its free end with said door when said retractable nozzle is lowered to hold said door open.

6. Vehicle washing and drying apparatus according to claim 3 wherein:
    said pusher arm includes an adjustment stud on the free extremity thereof for adjusting the degree to which said door is held open when said retractable nozzle is in its normal position.

7. Vehicle washing and drying apparatus according to claim 4 wherein:
    said retraction means includes detector means for detecting said first vehicle and power means connected with said retractable top nozzle and said detector means being operative in response to detection of said first vehicle to actuate said power means to retract said retractable nozzle.

8. Vehicle washing and drying apparatus according to claim 4 wherein:
    said control throttle means includes a pusher carried from said retractable nozzle and engageable with said throttle means when said retractable nozzle is lowered to open said throttle means.

9. Vehicle washing and drying apparatus according to claim 1 wherein:
    said retraction means includes a pivot arm carried pivotally on one extremity from said retractable nozzle, a rocker arm pivotally mounted intermediately from said main nozzle and pivotally connected on one end to the free end of said pivot arm and fluid cylinder means connected between said frame and the end of said rocker arm opposite said one extremity.

10. Vehicle washing and drying apparatus according to claim 9 that includes:
    throttle means mounted in said first orifice means and shiftable between an open position and a closed position cooperating with said first orifice means to define a throttling orifice; and
    throttle control means connected with said throttle means and responsive to retraction of said retractable nozzle to close said throttle means.

11. Vehicle washing and drying apparatus according to claim 9 that includes:

detector means including switch means including a feeler arm projecting therefrom for detecting the profile of said first vehicle, said switch means being operative in response to depression of said feeler arm to be rendered operative and valve means connected with said switch means for controlling fluid to said cylinder.

12. Vehicle washing and drying apparatus according to claim 9 that includes:

track means for conveying said frame;
wheel means carrying said frame on said track means; and
drive means for driving said frame along said track means to convey said frame over said vehicles.

13. Vehicle washing and drying apparatus according to claim 1 wherein:

said main top nozzle is formed with side walls which taper downwardly and inwardly from the opposite sides thereof to terminate in said first orifice, said main nozzle further including peripheral seal means surrounding said first orifice for sealing against the top extremity of said retractable nozzle when said retractable nozzle is in its normal position.

14. Vehicle washing and drying apparatus according to claim 1 that includes:

entraining nozzle means mounted on said top nozzle, surrounding said second orifice means and cooperating therewith to form a funnel-shaped peripheral nozzle.

* * * * *